(12) United States Patent
Kang et al.

(10) Patent No.: US 12,238,321 B2
(45) Date of Patent: Feb. 25, 2025

(54) METHOD FOR FRAME PACKING IN A MPEG IMMERSIVE VIDEO FORMAT

(71) Applicants: HYUNDAI MOTOR COMPANY, Seoul (KR); KIA CORPORATION, Seoul (KR); EWHA UNIVERSITY—INDUSTRY COLLABORATION FOUNDATION, Seoul (KR)

(72) Inventors: Je Won Kang, Seoul (KR); Seung Wook Park, Yongin-si (KR); Young Bin Min, Gwangmyeong-si (KR)

(73) Assignees: HYUNDAI MOTOR COMPANY, Seoul (KR); KIA CORPORATION, Seoul (KR); EWHA UNIVERSITY INDUSTRY COLLABORATION FOUNDATION, Seoul (KR)

(*) Notice: Subject to any disclaimer, the term of this patent is extended or adjusted under 35 U.S.C. 154(b) by 193 days.

(21) Appl. No.: 18/021,267

(22) PCT Filed: Aug. 24, 2021

(86) PCT No.: PCT/KR2021/011250
§ 371 (c)(1),
(2) Date: Feb. 14, 2023

(87) PCT Pub. No.: WO2022/045717
PCT Pub. Date: Mar. 3, 2022

(65) Prior Publication Data
US 2023/0353770 A1     Nov. 2, 2023

(30) Foreign Application Priority Data

Aug. 24, 2020  (KR) .................. 10-2020-0106102
Aug. 24, 2021  (KR) .................. 10-2021-0111352

(51) Int. Cl.
*H04N 7/12*      (2006.01)
*H04N 19/127*    (2014.01)
(Continued)

(52) U.S. Cl.
CPC ......... *H04N 19/463* (2014.11); *H04N 19/127* (2014.11); *H04N 19/136* (2014.11);
(Continued)

(58) Field of Classification Search
CPC .................................................. H04N 19/127
See application file for complete search history.

(56) References Cited

U.S. PATENT DOCUMENTS 10,887,600 B2   1/2021   Liu et al.
10,891,784 B2   1/2021   Dore et al.
(Continued)

FOREIGN PATENT DOCUMENTS

KR     20190105011 A    9/2019
KR     20190121867 A   10/2019
(Continued)

OTHER PUBLICATIONS

Basel Salahieh et al., Test Model 6 for MPEG Immersive Video, ISO/IEC JTC 1/SC 29/WG 11 N19483, Jul. 2020, 39 pp.
(Continued)

*Primary Examiner* — Y Lee
(74) *Attorney, Agent, or Firm* — Lempia Summerfield Katz LLC

(57)  ABSTRACT

A frame packing method in an MPEG immersive video format is provided. A frame packing method in association with an immersive-video encoding and decoding method efficiently arranges, on a single screen, texture information and depth information of a basic view and an additional view to increase the coding efficiency.

17 Claims, 12 Drawing Sheets

(51) Int. Cl.
*H04N 19/136* (2014.01)
*H04N 19/172* (2014.01)
*H04N 19/184* (2014.01)
*H04N 19/463* (2014.01)
*H04N 19/597* (2014.01)

(52) U.S. Cl.
CPC ......... *H04N 19/172* (2014.11); *H04N 19/184* (2014.11); *H04N 19/597* (2014.11)

(56) References Cited

U.S. PATENT DOCUMENTS

| | | |
|---|---|---|
| 11,212,505 B2 | 12/2021 | Lee et al. |
| 2018/0270486 A1 | 9/2018 | Liu et al. |
| 2019/0371051 A1 | 12/2019 | Dore et al. |
| 2020/0336724 A1 | 10/2020 | Lee et al. |

FOREIGN PATENT DOCUMENTS

| | | |
|---|---|---|
| KR | 20200095408 A | 8/2020 |
| WO | 2018130491 A1 | 7/2018 |
| WO | 2018169367 A1 | 9/2018 |
| WO | 2020141260 A1 | 7/2020 |

OTHER PUBLICATIONS

International Search Report cited in corresponding international application No. PCT/KR2021/011250; Dec. 2, 2021; 5 pp.

Option A

FIG. 6B

Option C

Pack 0

| r0<br>a0T | r1<br>a2T | |
|---|---|---|
| r2<br>a4T | r3<br>a0D | r4<br>a2D |
| | r5<br>a4D | |

Pack 1

| r0<br>a1T | r1<br>a3T | |
|---|---|---|
| r2<br>a5T | r3<br>a1D | r4<br>a3D |
| | r5<br>a5D | r6 a1O \| r7 a3O<br>r8 a5O |

FIG. 6C

Option D

| Basic View – Texture |
| Additional View – Texture |
| Basic View – Depth | Null |
| Additional View – Depth |

FIG. 7

| Basic View – Texture |
| Basic View – Depth | Null |
| Additional View – Depth |
| Additional View – Texture |

FIG. 8

|             Basic View – Texture              |
|:---:|
| Additional View – Texture |

| Basic View – Depth (MSB-part) | Basic View – Depth (LSB-part) |
|:---:|:---:|
| Additional View – Depth (MSB-part) | Additional View – Depth (LSB-part) |

FIG. 9

|             Basic View – Texture              |
|:---:|

| Basic View – Depth (MSB-part) | Basic View – Depth (Least Significant Bit) |
|:---:|:---:|
| Additional View – Depth (MSB-part) | Additional View – Depth (LSB-part) |

| Additional View – Texture |
|:---:|

FIG. 10

METHOD FOR FRAME PACKING IN A MPEG IMMERSIVE VIDEO FORMAT

CROSS-REFERENCE TO RELATED APPLICATIONS

This application is a U.S. national stage of International Application No. PCT/KR2021/011250, filed on Aug. 24, 2021, which claims priority to Korean Patent Application No. 10-2020-0106102 filed on Aug. 24, 2020, and Korean Patent Application No. 10-2021-0111352 filed on Aug. 24, 2021, the entire disclosures of which are incorporated herein by reference.

TECHNICAL FIELD

The present disclosure relates to a frame packing method in an MPEG immersive video format.

BACKGROUND

The statements in this section merely provide background information related to the present disclosure and do not necessarily constitute prior art.

The Moving Picture Experts Group (MPEG) has begun MPEG-Immersive (MPEG-I) standardization as a project for coding immersive videos. The current standardization organization (ISO/IEC 23090 Part 7, Metadata for Immersive Video) is developing a compression standard for 3-degree-of-freedom-plus (3DoF+) videos and is expected to expand the technology development to a future compression standard for 6DoF videos. 6DoF provides omnidirectional videos with motion parallaxes of freedom, and 3DoF+ videos provide motion parallaxes within certain boundaries around the viewer's head with a fixed view.

6DoF videos or 3DoF+ videos can be obtained by using Windowed 6DoF and Omnidirectional 6DoF methods. Here, the Windowed 6DoF is obtained from a multi-view camera system, restricting the user to visually translating just between the current view and a neighboring view, which is like the user being confined to a small window vision. The omnidirectional 6DoF composes 360-degree videos into multiple views and provides viewing freedom in a limited space in concert with the user's points of view. For example, the omnidirectional 6DoF enables a viewer wearing a Head Mounted Display (HMD) to experience a 3D omnidirectional virtual environment in a limited area.

An immersive video is generally constituted by a texture video composed of RGB or YUV information and a depth video including 3D geometry information. The immersive video may further include an occupancy map for representing occlusion information in a 3-dimensional domain.

Coding of immersive video aims to impart motion parallax to an omnidirectional video while maintaining compatibility with 2D video codec standards, such as High Efficiency Video Coding (HEVC) and Versatile Video Coding (VVC). Since the immersive video takes account of view images necessary for viewing space extended in all directions, the resolution increases as the number of view images increases and the field of view increases. When reflecting the resultant increases in input/output interfaces and the amount of data for compression processing, the encoding process may suffer from an increased pixel rate and a declined coding efficiency. Therefore, various methods need to be considered for minimizing the pixel rate in the encoding process of immersive video and thus increasing the coding efficiency.

SUMMARY

The present disclosure seeks to provide a frame packing method in association with an immersive-video encoding and decoding method, for efficiently arranging, on a single screen, texture information and depth information of a basic view and an additional view to increase the coding efficiency.

One aspect of the present disclosure provides a method performed by an immersive video decoding apparatus for unpacking a pack including atlas components of an immersive video. The method for unpacking comprises decoding a packing flag from a bitstream. The method for unpacking also comprises, when the packing flag is true, decoding packing information from the bitstream. The method for unpacking also comprises decoding a subpicture or tile from the bitstream to generate the pack. The method for unpacking also comprises and a step of unpacking the atlas components from the pack by using the packing information.

Another aspect of the present disclosure provides a method performed by an immersive video encoding apparatus for packing atlas components of an immersive video. The method for packing comprises generating the atlas components from the immersive video. The method for packing also comprises obtaining a preset packing flag. The method for packing also comprises, when the packing flag is true, obtaining or generating packing information. The method for packing also comprises generating a pack by packing the atlas components based on the packing information As described above, the present disclosure according to at least one embodiment can provide a frame packing method for efficiently arranging, on a single screen, texture information and depth information of a basic view and an additional view to increase the coding efficiency in an immersive-video encoding process, lighten the burden of the network, and reduce the energy consumption of the video playback equipment for an immersive-video decoding process.

BRIEF DESCRIPTION OF THE DRAWINGS

FIGS. 6A, 6B, and 6C are diagrams illustrating a pack structure according to some embodiments of the present disclosure.

FIG. 7 is a diagram illustrating a pack structure according to another embodiment of the present disclosure.

FIG. 8 is a diagram of an example depth-information-first frame packing scheme according to at least one embodiment of the present disclosure.

FIG. 9 is a diagram of an example packing scheme of depth information having a 4:0:0 format according to at least one embodiment of the present disclosure.

FIG. 10 is a diagram of an example depth-information-first frame packing scheme according to another embodiment of the present disclosure.

DETAILED DESCRIPTION

Figure 1:
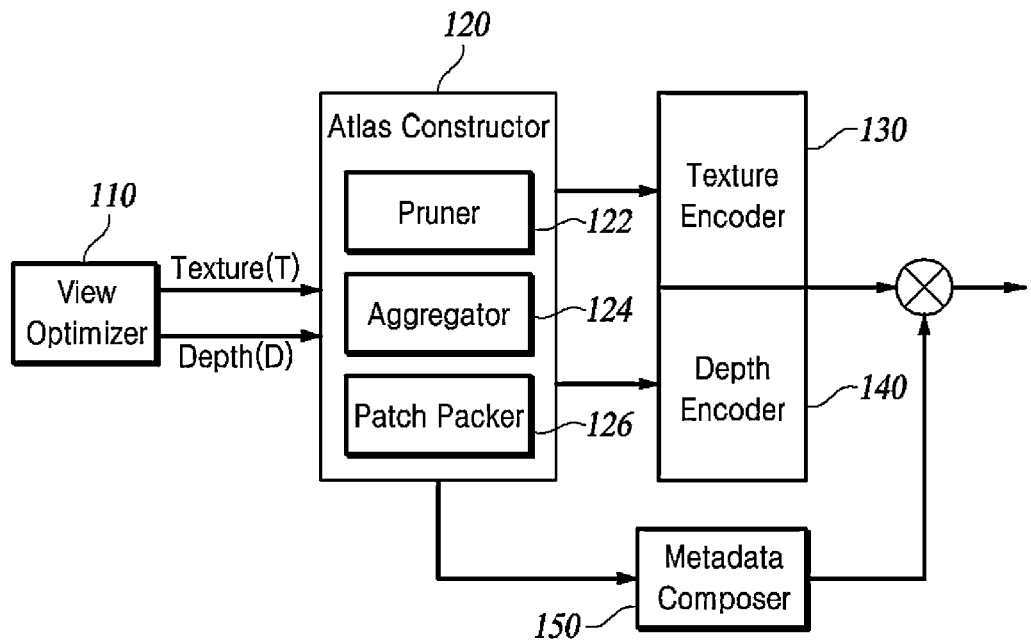
FIG. 1 is a block diagram illustrating an immersive video encoding apparatus that implements the techniques of the present disclosure.

Hereinafter, some embodiments of the present disclosure are described in detail with reference to the accompanying drawings. In the following description, like reference numerals designate like elements, although the elements are shown in different drawings. Further, in the following description of some embodiments, a detailed description of known functions and configurations incorporated therein may be omitted for the purpose of clarity and for brevity.

Additionally, various ordinal numbers or alpha codes, such as first, second, A, B, (a), (b), etc., are prefixed solely to differentiate one component from the other but not to imply or suggest the substances, order, or sequence of the components. Throughout this specification, when a part "includes" or "comprises" a component, the part is meant to further include other components, rather than exclude other components, unless specifically stated to the contrary. The terms, such as "unit," "module," and the like, refer to units for processing at least one function or operation, which may be implemented by hardware, software, or a combination thereof.

The description of the present disclosure to be presented below in conjunction with the accompanying drawings is intended to describe embodiments of the present disclosure and is not intended to represent the only embodiments in which the technical idea of the present disclosure may be practiced.

FIG. 1 is a block diagram illustrating an immersive video encoding apparatus that implements the techniques of the present disclosure. The following describes an immersive-video encoding apparatus (hereinafter referred to as 'encoding apparatus') and sub-components of the device with reference to the illustration of FIG. 1.

The encoding apparatus includes a view optimizer 110, an atlas constructor 120, a texture encoder 130, a depth encoder 140, and a metadata composer 150 in whole or in part. The encoding apparatus uses the view optimizer 110 and the atlas constructor 120 sequentially to generate an MPEG Immersive Video (MIV) format from the inputted multi-view video and then uses the texture encoder 130 and the depth encoder 140 to encode MIV-format data.

The view optimizer 110 classifies all views included in the inputted multi-view video into a basic view(s) and an additional view(s).

Figure 2:
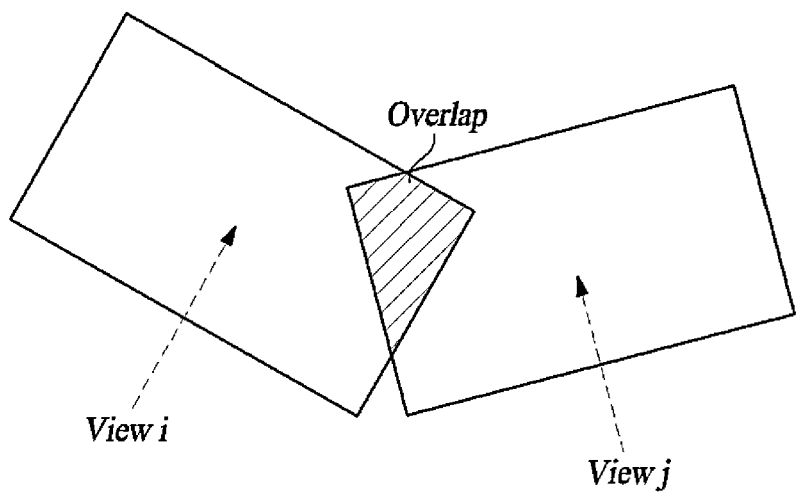
FIG. 2 is a diagram illustrating a process of view optimization according to at least one embodiment of the present disclosure.

For this view optimization, the view optimizer 110 calculates how many basic views are needed and selects as many basic views as the determined number of basic views. As illustrated in FIG. 2, the view optimizer 110 may determine a basic view and an additional view by using a physical location (e.g., an angular difference between views) and an overlap between the views. Accordingly, a view having the most common scenes among all views may be selected as a basic view. After the basic view and the additional views are selected, the basic view is preserved and directly inputted to the encoders.

In another embodiment according to the present disclosure, the view optimizer 110 may first group all views in consideration of views and uses of cameras and then may construct basic views and additional views for each group.

The atlas constructor 120 constructs an atlas from the basic views and additional views. As described above, the basic views selected by the view optimizer 110 are included in the atlas as intact images. The atlas constructor 120 generates patches representing parts that are difficult to predict based on the basic views from the additional views and then constructs the patches generated from a plurality of additional views into one atlas. To generate the atlas, the atlas constructor 120 includes a pruner 122, an aggregator 124, and a patch packer 126, as illustrated in FIG. 1.

Figure 3:
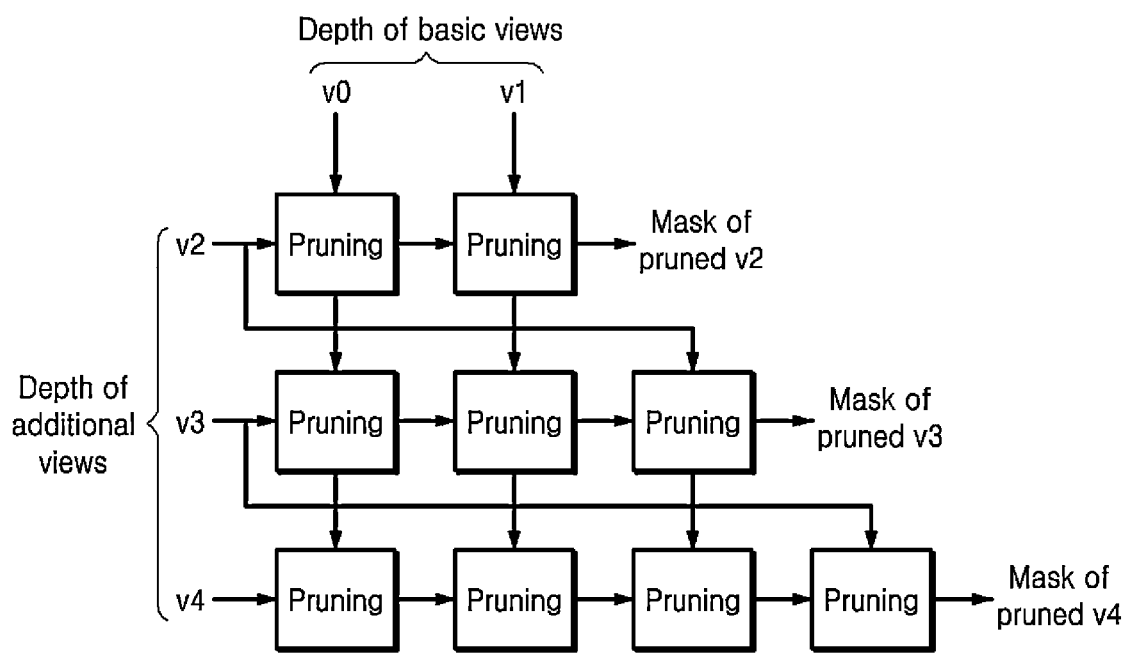
FIG. 3 is a diagram illustrating the operation of a pruner according to at least one embodiment of the present disclosure.

As illustrated in FIG. 3, the pruner 122 removes overlapping portions of additional views while preserving the basic views and generates binary masks indicating whether there is an overlap between pixels included in the additional views. For example, the mask of one additional view has the same resolution as the additional view, a value of '1' indicates that the value of a depth image at the corresponding pixel is valid, and '0' indicates that a pixel needs to be removed for overlapping with the basic view.

The pruner 122 searches for overlapping information by performing warping in 3D coordinates based on depth information. Here, warping refers to a process of predicting and compensating for a displacement vector between two views by using depth information.

The pruner 122, as illustrated in FIG. 3, checks the redundancy with even the additional view that has completed the pruning process to finally generate the masks. For example, in FIG. 3, in the pruning process of an additional view v2, the pruner 122 checks its overlapping with the reference views v0 and v1 to generate a mask, and in pruning an additional view v3, the pruner 122 determines its overlapping with the reference views v0 and v1 and further with the additional view v2 to generate a mask.

The aggregator 124 accumulates the masks generated for the respective additional views in the temporal order. Such accumulation of the masks can lighten the construction information of the final atlas.

The patch packer 126 packs the patches of the basic views and additional views to finally generates an atlas. When processing texture and depth information of the basic views, the patch packer 126 constructs an atlas of the basic views by using the original image as a patch. With respect to texture and depth information of the additional views, the patch packer 126 generates block patches by using the masks and then packs the block patches to construct an atlas of the additional views.

The texture encoder 130 encodes a texture atlas.

The depth encoder 140 encodes a depth atlas.

The texture encoder 130 and the depth encoder 140, as described above, may be implemented using an existing encoder, such as High Efficiency Video Coding (HEVC) or VVC.

The metadata composer 150 generates a sequence parameter related to encoding, metadata for a multi-view camera, and parameters related to an atlas.

This encoding apparatus generates and transmits a bitstream obtained by multiplexing encoded textures, encoded depths, and metadata.

Figure 4:
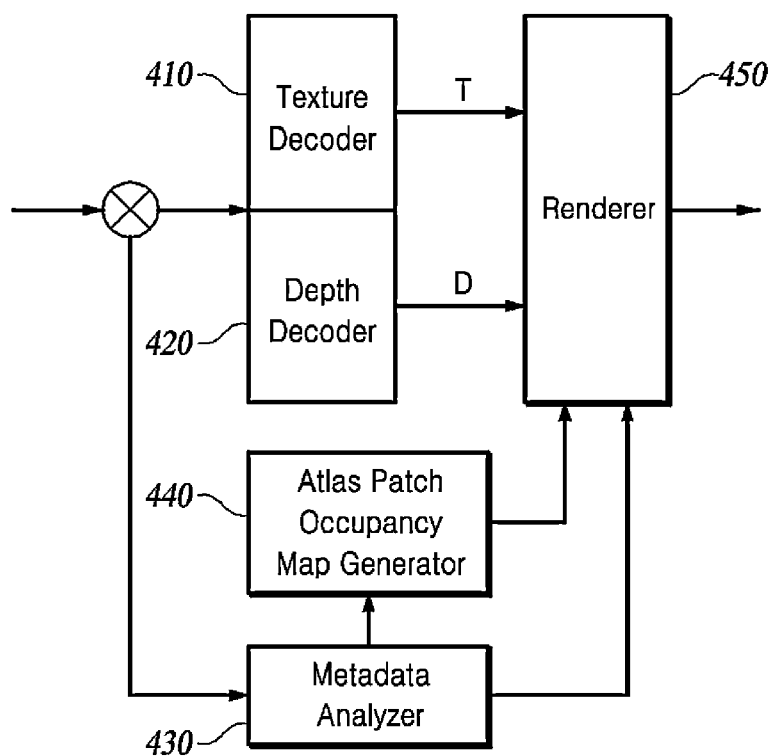
FIG. 4 is a block diagram illustrating an immersive video decoding apparatus that implements the techniques of the present disclosure.

FIG. 4 is a block diagram illustrating an immersive video decoding apparatus that implements the techniques of the present disclosure.

The immersive video decoding apparatus (hereinafter, 'decoding apparatus') includes a texture decoder 410, a depth decoder 420, a metadata analyzer 430, an atlas patch occupation map generator 440 (hereinafter referred to as 'occupancy map generator'), and a renderer 450 in whole or in part.

The texture decoder 410 decodes a texture atlas from the bitstream.

The depth decoder 420 decodes a depth atlas from the bitstream.

The metadata analyzer 430 parses metadata from the bitstream.

The occupancy map generator 440 generates an occupancy map by using atlas-related parameters included in the metadata. The occupancy map is information related to the positions of block patches, may be generated by an encoding apparatus, and then may be transmitted to a decoding apparatus or generated by the decoding apparatus using metadata.

The renderer 450 uses the texture atlas, the depth atlas, and the occupancy map to reconstruct the immersive video to be provided to the user.

As described above, encoding of the atlas may be performed by using an existing encoder, such as HEVC or Versatile Video Coding (VVC). This may take two modes applied.

Figure 5:
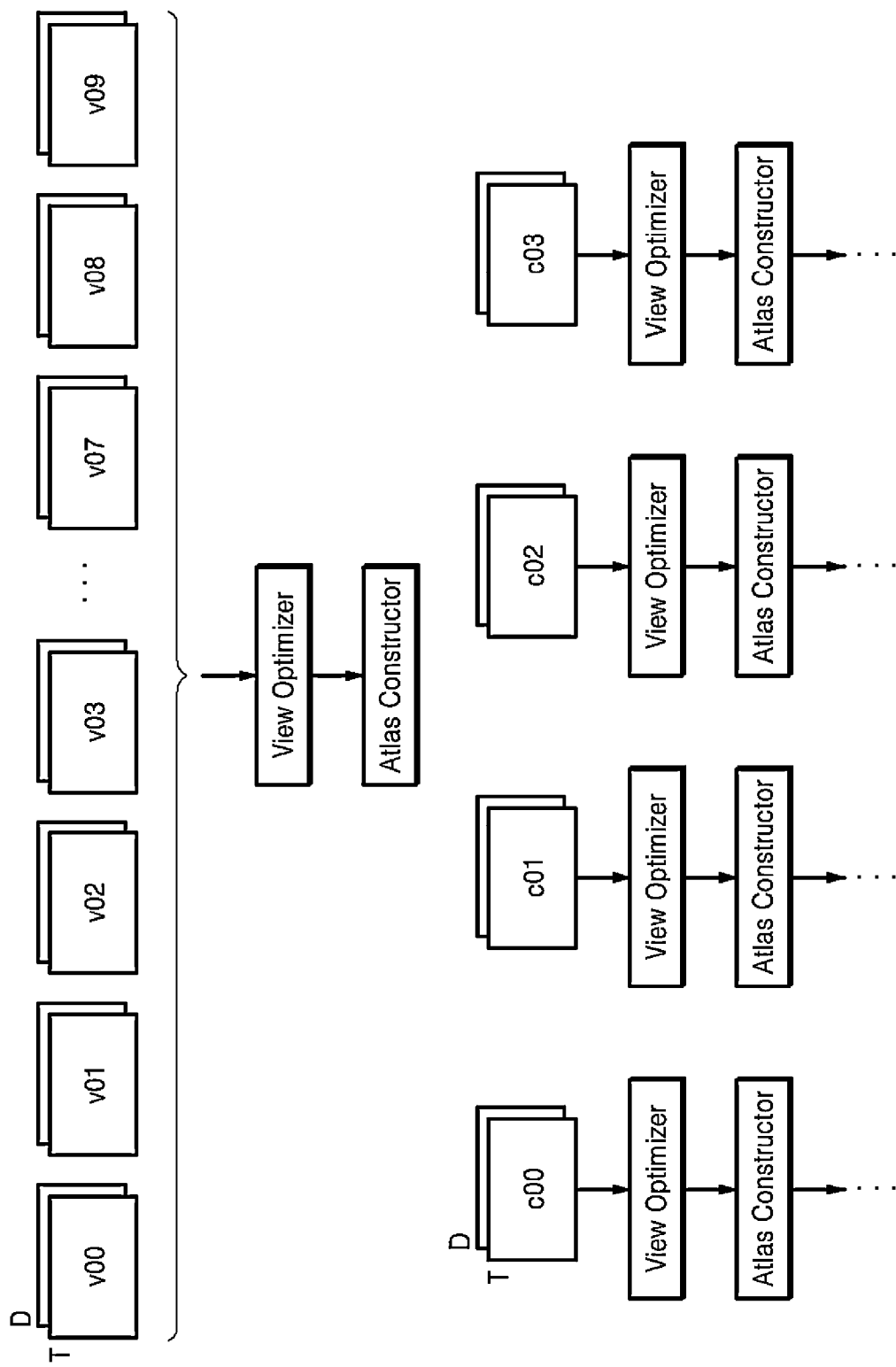
FIG. 5 is a diagram illustrating an encoding scheme in MPEG Immersive Video (MIV) mode according to at least one embodiment of the present disclosure.

FIG. 5 is a diagram illustrating an encoding scheme in MIV mode according to at least one embodiment of the present disclosure.

In a MIV mode, the encoding apparatus compresses and transmits all images. For example, as illustrated in FIG. 5, ten multi-view videos when passing through the view optimizer 110 and the atlas constructor 120 in sequence generate an atlas for one basic view and atlases for three additional views. In this case, according to the construction of the multi-view video, the encoding apparatus may differently construct the number of basic views and the number of additional views. The encoding apparatus may respectively encode the generated atlases by using an existing encoder to generate a bitstream.

In the other mode, which is a MIV view mode, the encoding apparatus skips generating an atlas and transmits, for example, five views out of all ten views. The decoding apparatus composes the remaining five intermediate views by using the received depth information and texture information.

The advantages of using the atlas in terms of reducing the complexity of the decoding apparatus are as follows. As illustrated in FIG. 5, when the encoding apparatus transmits all ten views by using a total of twenty encoders including texture and depth, the decoding apparatus also needs a total of twenty decoders including texture and depth. In contrast, where the encoding apparatus generates atlases for one basic view and three additional views and transmits the atlases by using a total of eight encoders including texture and depth, the decoding apparatus may just have eight decoders including texture and depth. Thus, the complexity may be greatly reduced.

As described above, compared to the method of constructing texture and depth videos in different atlases, the frame-packed video coding method indicates that texture and depth images are composed in one video atlas. Using this method can further reduce the number of decoders included in the decoding apparatus.

The encoding apparatus may be responsive to a packing flag being activated (i.e., true) for packing various atlases' different components (e.g., video data representing texture, depth, or occupancy) into a frame or pack including one or several of those components and then performing the encoding step. The encoding apparatus may encode those packs, each assigned a unique identifier (id), into a video bitstream. At this time, all video data items included in the same pack have the same YUV sampling format and bit depth.

Figure 6A:
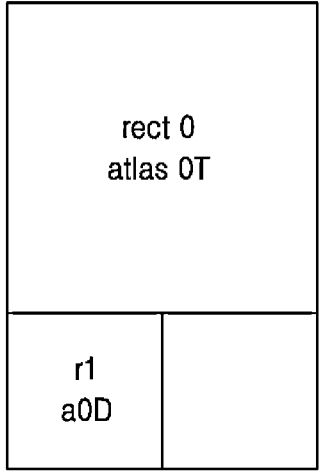
Figure 6A:
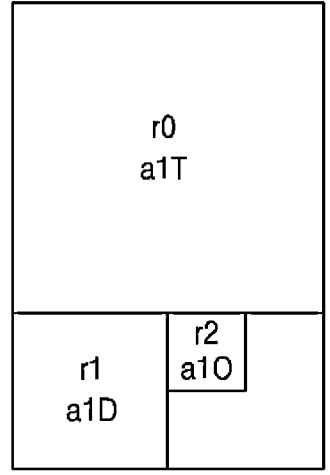
Figure 6A:
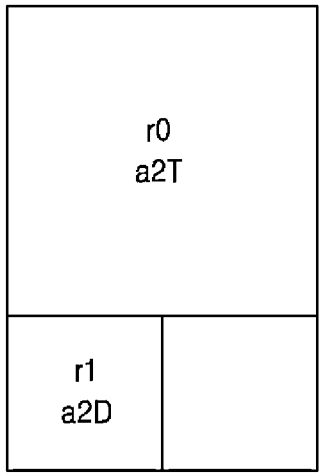
Figure 6A:
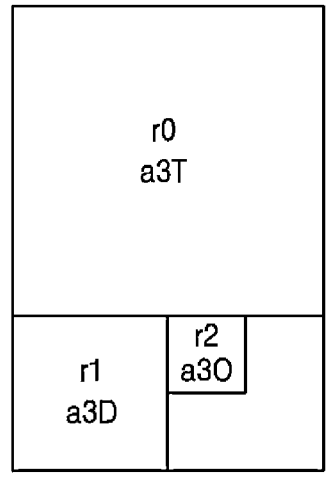
Figure 6A:
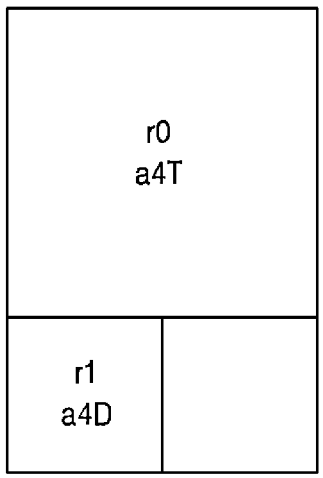
Figure 6A:
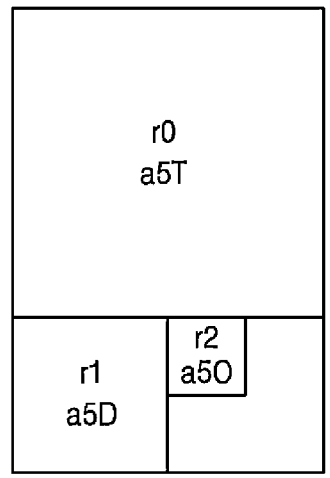
Figure 6B:
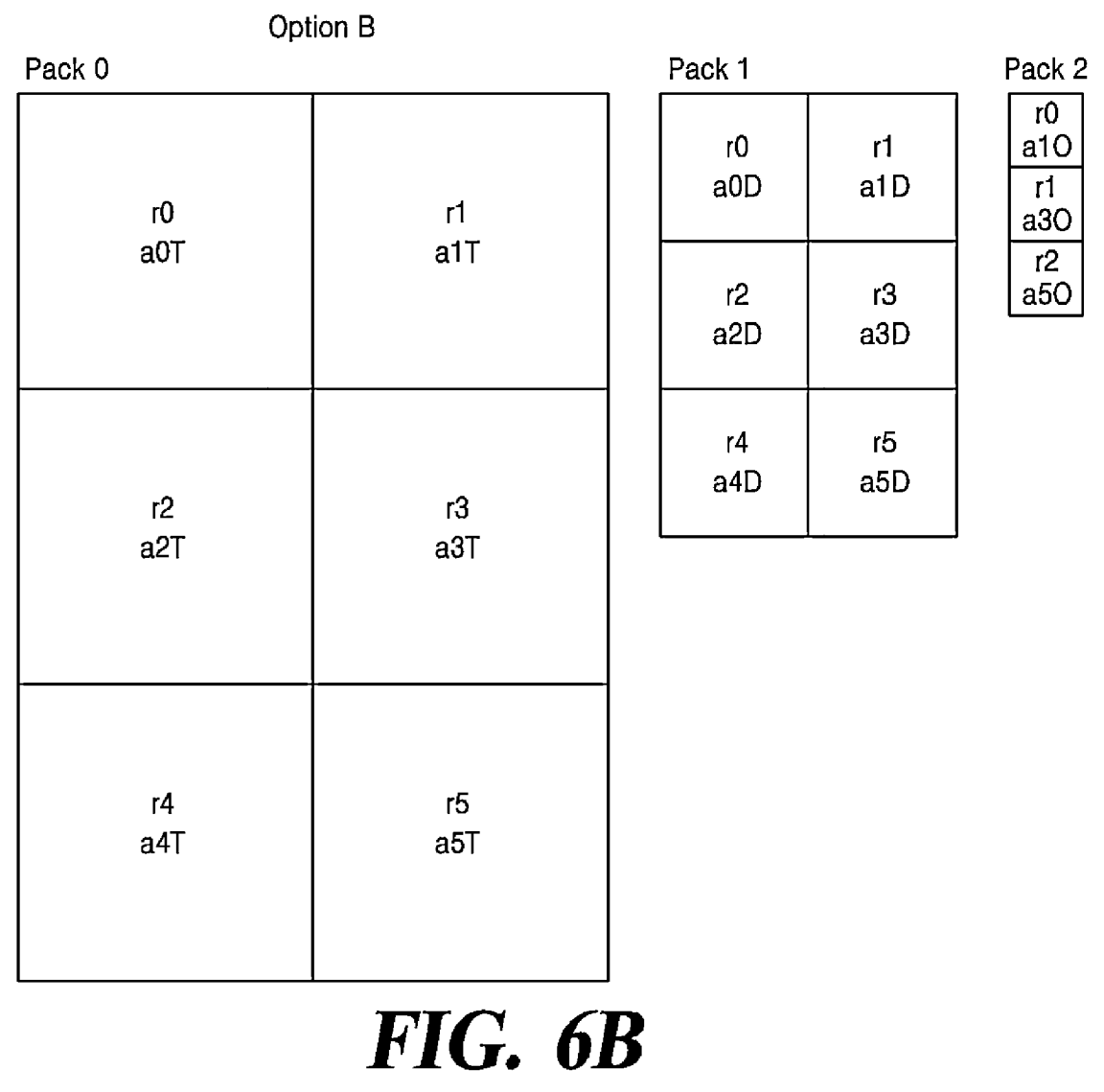

FIGS. 6A, 6B, and 6C are diagrams illustrating a pack structure according to some embodiments of the present disclosure.

The examples of FIGS. 6A, 6B, and 6C show various pack structures including six information items on texture video, depth video, and occupancy generated from three groups (each including one primary view and an additional view). Atlas 0, atlas a2, and atlas a4 respectively contain basic views, and atlases a1, a3, and a5 respectively contain additional views. An atlas related to an additional view may include occupancy information. As described above, the encoding apparatus may include occupancy information in a pack before transmitting it to the decoding apparatus, or the decoding apparatus may generate an occupancy map related to occupancy information. In the examples of FIGS. 6A, 6B, and 6C, the number representing each atlas is suffixed by T representing texture, D representing depth, or O representing occupancy information. Additionally, 'r' is suffixed by numbers representing the order of all atlases in the pack.

In option A illustrated in FIG. 6A, one pack is constructed with information items on texture video, depth video, and occupancy, which are different components of the same atlas.

In option B illustrated in FIG. 6B, a pack is constructed with identical components obtained from different atlases.

In option C illustrated in FIG. 6C, one pack may be constructed with information items on texture video, depth video, and occupancy, which are different components of different atlases.

FIG. 7 is a diagram illustrating a pack structure according to another embodiment of the present disclosure.

As in option D illustrated in FIG. 7, one pack may be composed by using only texture video and depth video for one group (excluding occupancy information). At this time, the pack is composed, in the order from top to bottom, of a texture video of a basic view, a texture video of an additional view, a basic-view depth video on the left, and an additional-view depth video. Additionally, null data is included in the lower right corner of the pack. In options A to D, the packs are constructed with the depth video being downsampled.

In options A to D, each atlas component is frame-packed but may be constructed and transmitted as a tile of HEVC or a subpicture of VVC to a subsequent encoder. In this case, construction information of each tile and subpicture, e.g., each rectangle's upper left coordinate, depth, and height, may be transferred from the encoding apparatus to the decoding apparatus by using a Supplementary Enhancement Information (SEI) message.

Meanwhile, for each option, one encoder or decoder is needed to encode or decode one pack. Compared to when no pack construction was provided and two encoders or decoders, for example, were required for each basic view or additional view, the embodiments can be responsible for reducing the complexity of the encoding apparatus and the decoding apparatus.

The embodiments disclose frame packing methods in an immersive video format. More specifically, in an immersive video encoding and decoding method, the embodiments provide frame packing methods for efficiently arranging texture and depth information of a basic view and an additional view on one screen to increase the coding efficiency.

In some embodiments according to the present disclosure, when the packing flag is true, the encoding apparatus may generate a pack by packing atlas components based on the packing information, and the decoding apparatus may unpack the pack back to the atlas components based on the packing information.

The encoding apparatus may obtain a preset packing flag.

In another embodiment of the present disclosure, the encoding apparatus may use a predetermined frame packing method without using a packing flag.

In another embodiment according to the present disclosure, the encoding apparatus may generate a packing flag. For example, when the texture video and the depth video have the same format of YUV 4:2:0, the encoding apparatus sets the packing flag to true. On the other hand, when the texture video is YUV 4:2:0 different in format from the depth video of YUV 4:0:0, the encoding apparatus may set the packing flag to false. Here, the YUV 4:0:0 format indicates that among the Y, U, and V channels only the Y channel is used (the U and V channels do not exist). Meanwhile, even in the above example, since the packing flag depends on the predetermined format of the inputted video, the packing flag can also be seen to be preset.

The atlas components include a base view's texture video, a base view's depth video, an additional view's texture video, and an additional view's depth video, which are all generated from the immersive video.

The packing information is information related to the construction of a pack, and it may include a flag indicating the priority of a depth video, a bit depth of a texture video, a bit depth of a depth video, a null data flag, and a flag indicating a multi-view video group, etc. The encoding apparatus may be responsive to the packing flag being true for obtaining or generating such packing information. For example, when the pack includes null data, the encoding apparatus may set the null data flag to true and then transmit the same to the decoding apparatus. Details on the null data are described below.

In frame packing according to the present disclosure, the encoding apparatus may be responsive when a flag indicating the priority of depth video being true for performing a depth-information-first construction of frame pack.

When different image information items are packed in one video subpicture or tile as in option A illustrated in FIG. 6A, option C illustrated in FIG. 6C, or option D illustrated in FIG. 7, the frame pack construction may be performed based on the dependence between the respective video information items during the decoding process. From the standpoint of the decoding apparatus, information that can be decoded more independently may be placed at an earlier stage in the pack construction, and information that needs to use the earlier placed information may be placed at a later stage in the pack construction.

Priorities in terms of an encoding apparatus or a decoding apparatus according to encoding order and dependence are as follows: texture video of a basic view, depth video of a basic view, depth video of an additional view, and texture video of an additional view. Another order begins with a depth video of a basic view, proceeding to a texture video of a basic view, a depth video of an additional view, and a texture video of an additional view. As described above, this is because only when the decoding of the depth information precedes, the texture video of the additional view may be decoded after warping based on the depth information.

FIG. 8 is a diagram of an example depth-information-first frame packing scheme according to at least one embodiment of the present disclosure.

For example, with option D illustrated in FIG. 7, one pack may be constructed as illustrated in FIG. 8. Further, whereas option A in FIG. 6A illustrates that the case of atlas 0 constituting the basic view renders the texture information to come first, the case of atlas a1 constituting the additional view may be made to render the depth information to come first.

As described above, constructing the pack in the order of dependence between the respective atlas components can save memory in the decoding process.

In at least one embodiment of the present disclosure, when texture and depth information items have different channels and bit depths, a pack may be constructed by using a null data area.

As described above, all video data items contained in the same pack have the same YUV sampling format and bit depth. However, for example, when encoding using the HEVC main10 profile, no difficulty arises with encoding a YUV 4:2:0 format of texture video having a 10-bit bit depth, but there may be difficulties with compressing a YUV 4:0:0 format of depth video having a 10-bit or greater bit depth. In general, depth video may be represented by a depth value of 16 bits.

To solve the difficulties, the encoding apparatus may divide the depth video into a Most Significant Bit (MSB) part and a Least Significant Bit (LSB) part and then may pack the MSB parts and the LSB parts respectively into one tile or a subpicture. For example, as illustrated in FIG. 9, in option D, depth information having a 16-bit depth may be packed after being divided into MSB-part and LSB-part images each having a bit depth of 8 bits. Here, in the pack construction of option D illustrated in FIG. 7, the null data area may be used to place the MSB-part or LSB-part images. FIG. 9 illustrates the LSB-part images as being disposed in the null data area.

In another embodiment according to the present disclosure, when using a depth-information-first frame packing scheme, as illustrated in FIG. 10, a pack may be constructed, in sequence, of a texture video of a basic view, depth videos (MSB-part and LSB-part) of a basic view, depth videos (MSB-part and LSB-part) of an additional view, and texture video of an additional view.

Meanwhile, in another embodiment according to the present disclosure, when packing a depth video of a 4:0:0 format into a 4:2:0 format, an encoding apparatus may use the following method.

First, when the bit depth of the depth video is smaller than or equal to that of the texture video, the encoding apparatus puts the depth video of 4:0:0 into the Y channel and puts a preset value (e.g., 0 or 128) or the Y channel after downsampling, into the U and V channels.

Then, when the bit depth of the depth video is greater than that of the texture video, the encoding apparatus puts an MSB-part depth video or an LSB-part depth video as much as the bit depth of the texture video into the Y channel and packs the remaining information into U and V channels.

The null data is data representing an area located at the lower right corner of the example of FIG. 7, where none of the valid information, such as texture or depth information, is packed into the corresponding area to the null data. As illustrated in FIG. 7, when such null data is transferred after being constructed as independent tiles or subpictures, issues may arise, such as small but additional bits involved and a delay in the decoding process. Accordingly, the encoding apparatus may use an SEI message signal transferred in company for signaling a null data flag indicating whether the corresponding area includes null data in addition to construction information of each tile and subpicture. If the corresponding area contains null data, the decoding apparatus may skip additional decoding of the tile and fill the corresponding area to the null data with a predetermined value (e.g., 0 or 128).

Figure 11:
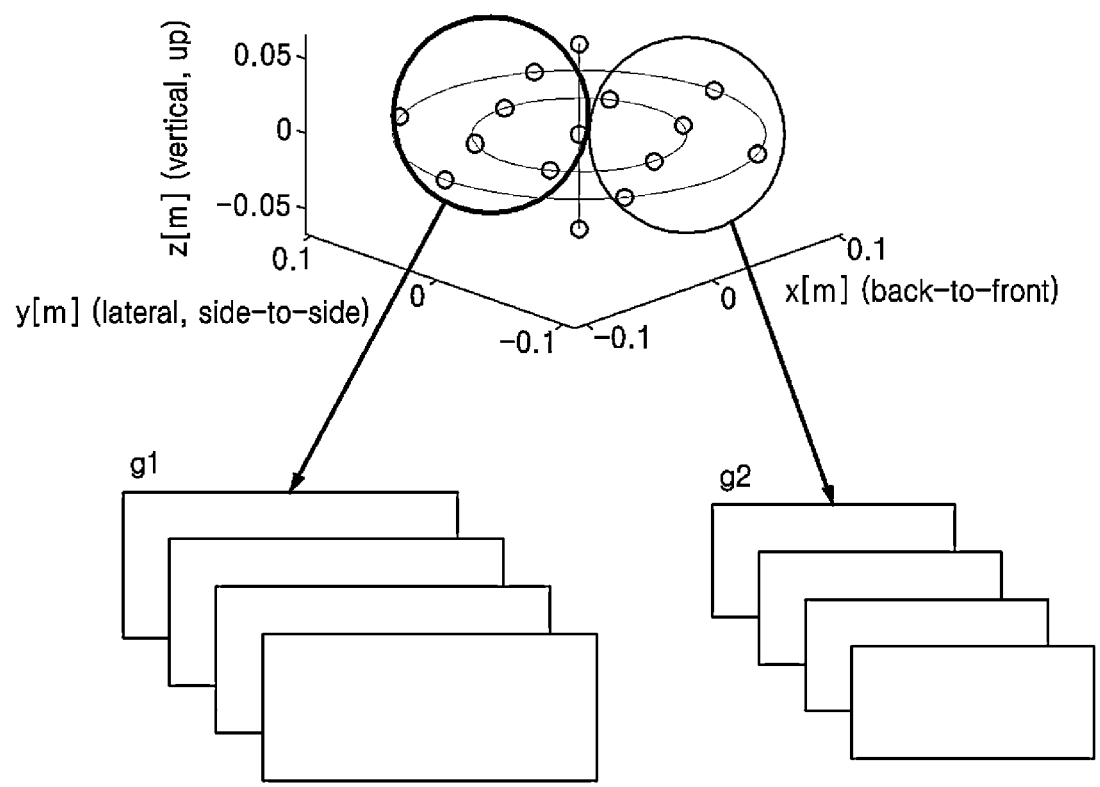
FIG. 11 is a conceptual illustration of multi-view video groups according to at least one embodiment of the present disclosure.

FIG. 11 is a conceptual illustration of multi-view video groups according to at least one embodiment of the present disclosure.

Multi-view video groups represent a set of videos obtained by capturing the same subject from one or more (multi-view) cameras located in adjacent areas. For example, the camera arrangement as illustrated in FIG. 11 exhibits the construction of two groups g1 and g2. In this case, the videos constituting g1 do not overlap the videos constituting g2, and adding all the videos of g1 and g2 can construct the entire video. When the flag representing a multi-view video group is true, each group of multi-view video groups has basic views and additional views for each group. At this time, one pack may be composed of only basic views and additional views in the same group. In other words, viewpoint videos in different groups are not packed into one picture. The encoding apparatus performs frame packing for each multi-view video group. This means that the encoding apparatus can construct one pack with only the basic views and the additional views included in one group.

Meanwhile, in VVC, constructing subpictures allows respective areas to be encoded in units of the independent picture. During this picture-by-picture encoding process, a specific encoding algorithm may be used adaptively or unused forcibly. For example, a deblocking filter, a Sample Adaptive Offset (SAO) filter, and an Adaptive Loop Filter (ALF) constituting an in-loop filter of VVC are encoding technologies for improving image quality in terms of human perception. Such an encoding technique may be essential for a texture atlas image of a basic view but may not be necessary for a depth image or an atlas of an additional view in which differences between boundaries need to be preserved. Accordingly, when encoding such an atlas image after constructing it as subpictures, the encoding apparatus or the decoding apparatus forces the non-use of an in-loop filter.

As described above, when compressing each subpicture, the encoding apparatus or decoding apparatus may apply different codec profiles. For example, a codec profile supporting a 4:2:0 format is used to encode or decode a texture image. Whereas, a codec profile supporting a 4:0:0 format may be used for the encoding or decoding of a depth image.

The encoding apparatus may transmit the above-described packing information related to the construction of the pack to the decoding apparatus.

Figure 12:
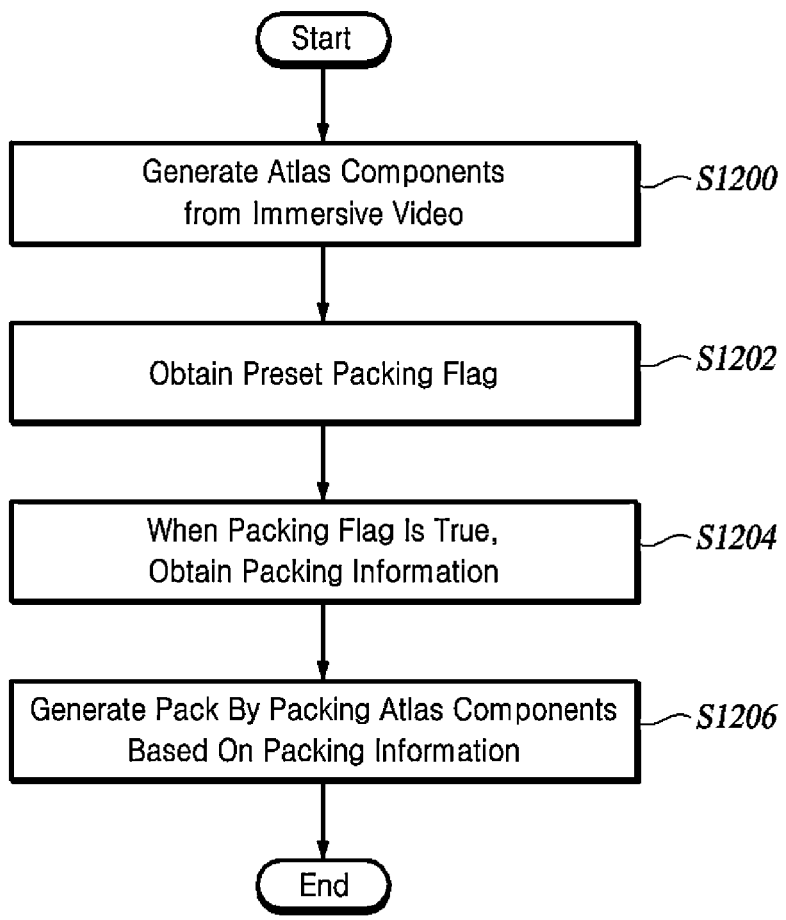
FIG. 12 is a flowchart of a method performed by an encoding apparatus for packing atlas components of an immersive video according to at least one embodiment of the present disclosure.

FIG. 12 is a flowchart of a method performed by an encoding apparatus for packing atlas components of an immersive video according to at least one embodiment of the present disclosure.

The encoding apparatus generates atlas components from the immersive video (S1200).

As described above, the encoding apparatus generates the atlas components by performing view optimization and atlas construction on the inputted immersive video. Here, the atlas components include a texture video of a basic view, a depth video of a basic view, a texture video of an additional view, and a depth video of an additional view, all of which are generated from the immersive video.

The encoding apparatus obtains a preset packing flag (S1202).

When the packing flag is true, the encoding apparatus obtains packing information (S1204). Here, the packing information may include a flag indicating the priority of depth video, a bit depth of texture video, a bit depth of depth video, a null data flag, and a flag indicating a multi-view video group. The encoding apparatus may generate some of the packing information as described above.

When the packing flag is not true, the encoding apparatus may perform encoding for each atlas component without obtaining all or some of packing information and without generating a pack.

The encoding apparatus generates a pack by packing the atlas components based on the packing information (S1206).

When the flag indicating the priority of the depth video is not true, the encoding apparatus constructs a pack, in sequence, of the texture video of the basic view, the texture video of the additional view, the depth video of the basic view, and the depth video of the additional view.

On the other hand, when the flag indicating the priority of the depth video is true, the encoding apparatus constructs a pack, in sequence, of the texture video of the basic view, the depth video of the basic view, the depth video of the additional view, and the texture video of the additional view.

When the depth video has a bit depth of 16 bits, the encoding apparatus may construct a pack by dividing the depth video into an MSB-part video and an LSB-part video both having a bit depth of 8 bits. At this time, when the flag indicating the priority of the depth video is true, the encoding apparatus may construct a pack, in sequence, of a texture video of the basic view, an MSB-part depth video of the basic view, an LSB-part depth video of the basic view, an MSB-part depth video of the additional view, an LSB-part depth video of the additional view, and a texture video of an additional view.

When packing the depth information of the 4:0:0 format in the 4:2:0 format, the encoding apparatus may be responsive when the bit depth of the depth video is smaller than or equal to that of the texture video for filling the Y channel with the depth information of the 4:0:0 format and filling the U and V channels with a preset value or the Y channel after being downsampled.

On the other hand, when the bit depth of the depth video is greater than that of the texture video, the encoding apparatus may fill the Y channel with the depth video or LSB-part depth video as much as the bit depth of the texture video and may fill the U and V channels with the remaining information.

As illustrated in FIG. 7 or 8, the encoding apparatus may include null data in a pack and set a null data flag indicating the inclusion to be true. In this case, the corresponding area to the null data may be represented by a preset value (e.g., 0 or 128).

When the flag representing the multi-view video group is true, each of at least one or more multi-view video groups includes a basic view and an additional view for each group. Therefore, the encoding apparatus constructs a pack for each multi-view video group. In other words, the encoding apparatus may construct one pack with only the basic views and the additional views included in one group.

The encoding apparatus constructs the packs into subpictures or tiles and then encodes the latter.

The encoding apparatus transmits the decoding apparatus a bitstream after encoding the packing flag, the packing information, and the packs.

Figure 13:
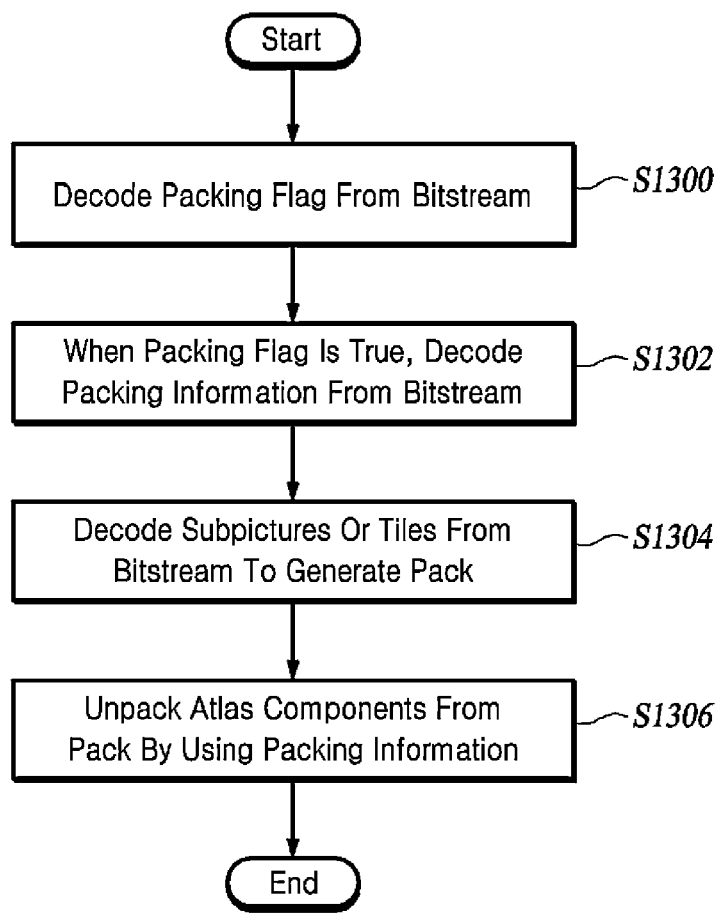
FIG. 13 is a flowchart of a method performed by a decoding apparatus for unpacking a pack including atlas components of an immersive video according to at least one embodiment of the present disclosure.

FIG. 13 is a flowchart of a method performed by a decoding apparatus for unpacking a pack including atlas components of an immersive video according to at least one embodiment of the present disclosure.

The decoding apparatus decodes the packing flag from the bitstream (S1300).

When the packing flag is true, the decoding apparatus decodes packing information from the bitstream (S1302). Here, the packing information may include a flag indicating the priority of a depth video, a bit depth of a texture video, a bit depth of a depth video, a null data flag, and a flag indicating a multi-view video group.

When the packing flag is not true, the decoding apparatus may perform decoding for each atlas component without decoding all or some of the packing information and without generating a pack.

The decoding apparatus decodes subpictures or tiles from the bitstream to generate a pack (S1304).

The decoding apparatus unpacks the atlas components from the pack by using the packing information (S1306). Here, the atlas components include a texture video of a basic view, a depth video of a basic view, a texture video of an additional view, and a depth video of an additional view, all of which are for reconstructing the immersive video.

When the null data flag is true, the pack includes null data, and the decoding apparatus may skip additional tile decoding and fill the corresponding area to the null data with a predetermined value (e.g., 0 or 128).

As described above, according to some embodiments of the present disclosure, frame packing methods are provided for efficiently arranging texture information and depth information of a basic view and an additional view on a single screen, thereby boosting the coding efficiency in an immersive video encoding process.

In each flowchart according to the embodiment, it is described that respective processes are executed in sequence, but the present disclosure is not limited thereto. In other words, since it is applicable that the processes described in the flowchart are changed and executed or one or more processes are executed in parallel, the flowchart is not limited to a time series order.

Meanwhile, various functions or methods described in the present disclosure may also be implemented by instructions stored in a non-transitory recording medium, which may be read and executed by one or more processors. The non-transitory recording medium includes, for example, all types of recording devices storing data in a form readable by a computer system. For example, the non-transitory recording medium includes storage media such as an erasable programmable read only memory (EPROM), a flash drive, an optical driver, a magnetic hard drive, and a solid state drive (SSD).

Although embodiments of the present disclosure have been described for illustrative purposes, those having ordinary skill in the art should appreciate that various modifications, additions, and substitutions are possible, without departing from the idea and scope of the claims. Therefore, embodiments of the present disclosure have been described for the sake of brevity and clarity. The scope of the technical idea of the present embodiments is not limited by the illustrations. Accordingly, one of ordinary skill would understand the scope of the claims is not to be limited by the above explicitly described embodiments but by the claims and equivalents thereof.

REFERENCE NUMERALS

110: view optimizer
120: atlas constructor
122: pruner
124: aggregator
126: patch packer
130: texture encoder
140: depth encoder
150: metadata composer
410: texture decoder
450: depth decoder
430: metadata analyzer
440: atlas patch occupancy map generator
450: renderer

What is claimed is:

1. A method performed by an immersive video decoding apparatus for unpacking a pack including atlas components of an immersive video, the method comprising:
decoding a packing flag from a bitstream;
when the packing flag is true, decoding packing information from the bitstream;
decoding a subpicture or tile from the bitstream to generate the pack; and
unpacking the atlas components from the pack by using the packing information.

2. The method of claim 1, wherein the atlas components comprise:
videos for reconstructing the immersive video, the videos including a texture video of a basic view, a depth video of a basic view, a texture video of an additional view, and a depth video of an additional view.

3. The method of claim 2, wherein the packing information comprises:
a flag indicating a priority of a depth video, a bit depth of a texture video, a bit depth of the depth video, a null data flag, and a flag indicating a multi-view video group.

4. The method of claim 3, wherein, when the flag indicating the priority of the depth video is not true, the pack is composed sequentially of the texture video of the basic view, the texture video of the additional view, the depth video of the basic view, and the depth video of the additional view.

5. The method of claim 3, wherein, when the flag indicating the priority of the depth video is true, the pack is composed sequentially of the texture video of the basic view, the depth video of the basic view, the depth video of the additional view, and the texture video of the additional view.

6. The method of claim 3, wherein when the bit depth of the depth video is 16 bits, the pack is composed by dividing the depth video into a Most Significant Bit or MSB-part video having a bit depth of 8 bits and a Least Significant Bit or LSB-part video having a bit depth of 8 bits.

7. The method of claim 6, wherein, when the flag indicating the priority of the depth video is true, the pack is composed sequentially of the texture video of the basic view, an MSB-part upper depth video of the basic view, an LSB-part depth video of the basic view, an MSB-part depth video of the additional view, an LSB-part depth video of the additional view, and the texture video of the additional view.

8. The method of claim 3, further comprising:
packing a 4:0:0 format of depth information into a 4:2:0 format,
wherein, when the bit depth of the depth video is less than or equal to the bit depth of the texture video, a Y channel is filled with the 4:0:0 format of depth information, and a U channel and a V channel are filled with a preset value or a downsampled value of the Y channel.

9. The method of claim 8, wherein, when the bit depth of the depth video is greater than the bit depth of the texture video, the Y channel is filled with a Most Significant Bit or MSB-part depth video or a Least Significant Bit or LSB-part depth video equivalent to the bit depth of the texture video, and the U channel and the V channel are filled with remaining information after filling the Y channel.

10. The method of claim 3, wherein, when the null data flag is true, the pack contains null data, and
wherein the unpacking fills a corresponding area that corresponds to the null data with a preset value.

11. The method of claim 3, wherein, when the flag indicating the multi-view video group is true, each group of at least one or more multi-view video groups includes a basic view and an additional view for each multi-view video group, wherein the pack is composed of only the basic view and the additional view included in one multi-view video group.

12. The method of claim 2, further comprising:
utilizing no in-loop filter when decoding subpictures corresponding to the depth video of the basic view, the texture video of the additional view, and the depth video of the additional view.

13. A method performed by an immersive video encoding apparatus for packing atlas components of an immersive video, the method comprising:
generating the atlas components from the immersive video;
obtaining a preset packing flag;
when the packing flag is true, obtaining or generating packing information; and
generating a pack by packing the atlas components based on the packing information.

14. The method of claim 13, wherein the atlas components comprise:
videos generated from the immersive video, including a texture video of a basic view, a depth video of a basic view, a texture video of an additional view, and a depth video of an additional view.

15. The method of claim 13, wherein the packing information comprises:
a flag indicating a priority of a depth video, a bit depth of a texture video, a bit depth of the depth video, a null data flag, and a flag indicating a multi-view video group.

16. The method of claim 13, further comprising:
generating a bitstream by encoding the packing flag, the packing information, and the pack; and
transmitting the bitstream to an immersive video decoding apparatus.

17. The method of claim 15, wherein the obtaining or generating of the packing information comprises:
setting the null data flag to true when the pack includes an area of null data.

\* \* \* \* \*